(No Model.)
J. ALEXANDER.
SPRING BED BOTTOM.
No. 320,832. Patented June 23, 1885.
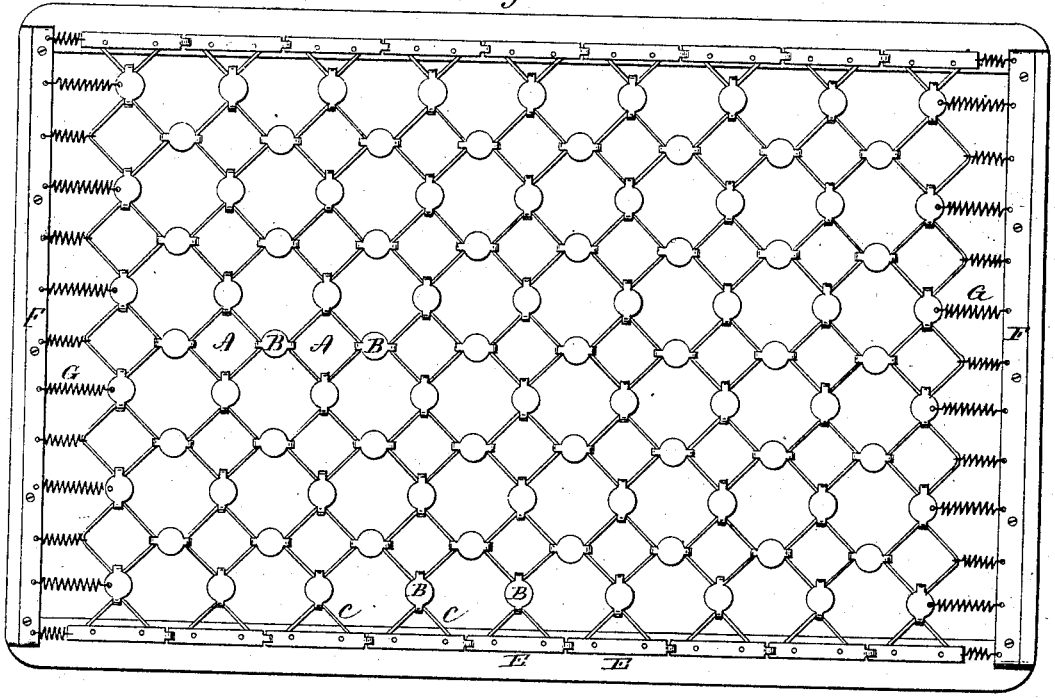
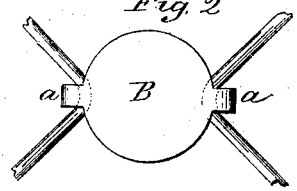
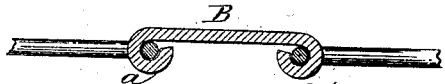
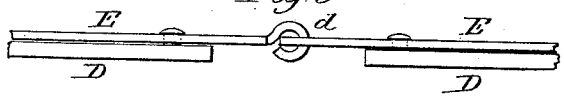
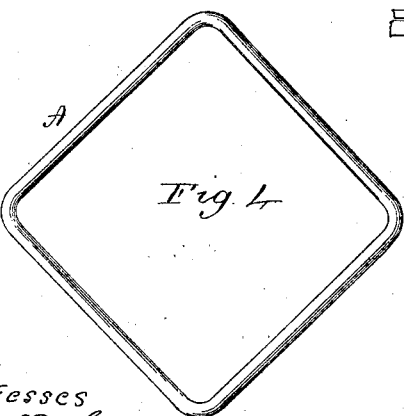
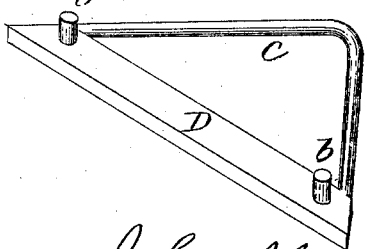
Witnesses
J. P. Shumway
Jos. C. Earle
John Alexander
Inventor
By atty
N. PETERS, Photo-Lithographer, Washington, D. C.

UNITED STATES PATENT OFFICE.

JOHN ALEXANDER, OF HARTFORD, CONNECTICUT, ASSIGNOR, BY MESNE ASSIGNMENTS, OF ONE-HALF TO JOHN CARLETON ALEXANDER, OF SAME PLACE.

SPRING BED-BOTTOM.

SPECIFICATION forming part of Letters Patent No. 320,832, dated June 23, 1885.

Application filed September 29, 1884. (No model.)

*To all whom it may concern:*

Be it known that I, JOHN ALEXANDER, of Hartford, in the county of Hartford and State of Connecticut, have invented a new Improvement in Spring Bed-Bottoms; and I do hereby declare the following, when taken in connection with accompanying drawings and the letters of reference marked thereon, to be a full, clear, and exact description of the same, and which said drawings constitute part of this specification, and represent, in—

Figure 1, a top view of the bed-bottom; Fig. 2, a detached view showing the top of one of the disks as connecting the two links; Fig. 3, a longitudinal section of the same; Fig. 4, one of the links detached; Fig. 5, a side view showing the connection between the two links; Fig. 6, one of the links detached, all of the figures excepting Fig. 1 enlarged.

This invention relates to an improvement in that class of spring bed-bottoms in which the supporting-surface is composed of a system of links combined with springs at each end of the bed-bottom; and it consists in the construction as hereinafter described, and more particularly recited in the claim.

The supporting-surface is composed of series of connected links, A, one of which is shown detached in Fig. 4. These links are substantially quadrangular in shape, as seen in Fig. 4, and are made from cast metal, as malleable iron, so that they are continuous without joint. Preferably the angles are rounded, as shown. The links are connected at their adjacent angles by disks B. These disks are made from cast metal, each with a tongue, $a$, at diametrically-opposite points, and are cut from ductile sheet metal, or may be cast from malleable metal. The tongues $a$ are bent around the adjacent angles of the links, as seen in Fig. 3, and so as to firmly unite adjacent links, the union being of a hinge-like character. The links are attached in this manner to form the supporting-surface of the bed.

At the edges the links C are of triangular form, as seen in Fig. 6. Two sides correspond substantially to one-half the links A. The third side, D, is flat, and is cast with one or more studs, $b$, extending upward from its upper surface. These links C are attached to the adjacent inside links by the disks B, in the manner as before described.

Upon the flat sides D of the links C metal links E are applied, each connected to the next by a hinge-like joint, $d$, as seen in Fig. 5. The joint is made by forming a tongue on the end of one piece and a like opening on the end of the next piece and bending the tongue through that opening, as indicated in Fig. 5, and as also seen in Fig. 1.

The auxiliary links E are attached to the side D by making perforations in the auxiliary links E, corresponding to the studs $b$ on the side D, then setting the auxiliary links over the studs, and riveting the studs down thereon, as indicated in Figs. 1 and 5.

At the extreme ends the several links are connected to the end bars, F F, by spiral springs G, in the usual manner for connecting this class of bed-bottoms.

By this construction the links are of the cheapest possible construction, and are united in the cheapest possible manner, but are yet very strong and durable. By the hinged link connections E E at the sides, the hinges of which come intermediate between adjacent links, C, the sides of the bed are firmly supported, and the bottom may be detached from its ends and rolled into a very compact form for transportation, and so that instead of being made up and necessarily attached to the frame, as in the more general construction, before transportation, the supporting or metal portion may be made complete as an article of manufacture independent of the frame, and thus shipped, the metal bars F to be attached to the wood frame; or the parts of the wood frame may be separated and arranged in compact form for transportation with the metal portion.

I am aware that bed-bottoms have been constructed consisting of several series of links connected, combined with springs at the ends to give elasticity to the bed-bottom—such, for illustration, as Patents Nos. 16,310, 135,580, and 304,717. I therefore do not claim, broadly, such a construction of bed-bottom.

I claim—

A bed-bottom composed of series of quadrangular-shaped links, the several links connected to each other at their adjacent angles, combined with connected metal links E, extending along each side of the bottom, and with half-quadrangular-shaped links C, attached to said straight links E, and connected to the adjacent links of the bottom, substantially as described.

JOHN ALEXANDER.

Witnesses:
SELAH A. HULL,
EMMA C. ANDREWS.